United States Patent [19]

Millot et al.

[11] Patent Number: 4,657,733
[45] Date of Patent: Apr. 14, 1987

[54] FUEL ASSEMBLY FOR A NUCLEAR REACTOR

[75] Inventors: Jean-Paul Millot, Elancourt; Guy Desfontaines, Puteaux; Michel Babin, Pantin, all of France

[73] Assignee: Framatome & Cie., Courbevoie, France

[21] Appl. No.: 579,940

[22] Filed: Feb. 14, 1984

[30] Foreign Application Priority Data

Feb. 25, 1983 [FR] France ................. 83 03154

[51] Int. Cl.$^4$ .................. G21C 1/06; G21C 3/10
[52] U.S. Cl. .................. 376/178; 376/364; 376/428; 376/451
[58] Field of Search ............... 376/178, 362, 364, 438, 376/440, 442, 453, 454, 428, 429, 433, 435; 411/81, 271

[56] References Cited

U.S. PATENT DOCUMENTS

| 2,884,038 | 4/1959 | Overton | 151/44 |
| 2,983,662 | 5/1961 | Shillitto et al. | 204/193.2 |
| 3,738,912 | 6/1973 | Rachor et al. | 176/71 |
| 3,960,655 | 6/1976 | Bohanen et al. | 176/18 |
| 4,198,272 | 4/1980 | Salmon | 176/40 |
| 4,418,036 | 11/1983 | Gjertsen et al. | 376/438 |
| 4,448,561 | 5/1984 | Le Pargneux | 403/19 |
| 4,452,755 | 6/1984 | Hylton | 376/364 |
| 4,492,668 | 1/1985 | Pilgrim, Jr. et al. | 376/440 |

FOREIGN PATENT DOCUMENTS

| 2742692 | 9/1977 | Fed. Rep. of Germany . |
| 3240061 | 10/1982 | Fed. Rep. of Germany . |
| 3309884 | 9/1984 | Fed. Rep. of Germany . |

Primary Examiner—John F. Terapane
Assistant Examiner—Eric Jorgensen
Attorney, Agent, or Firm—Pollock, Vande Sande & Priddy

[57] ABSTRACT

A nuclear fuel assembly has fuel rods connected to the lower end plate of the assembly. The connecting structure comprises an attachment plate which is superimposed on the lower end plate and which is formed with openings corresponding to the rods. The openings lead out into parallel grooves machined on the lower surface of the plate. Each rod comprises a lower part having three radial branches at 120°, each formed with an end extension projecting radially outwardly from the outline of the rod. The extensions engaged in a groove have a height substantially equal to the depth of the groove. Axial fixing and locking against rotation of the rods are thus ensured.

6 Claims, 5 Drawing Figures

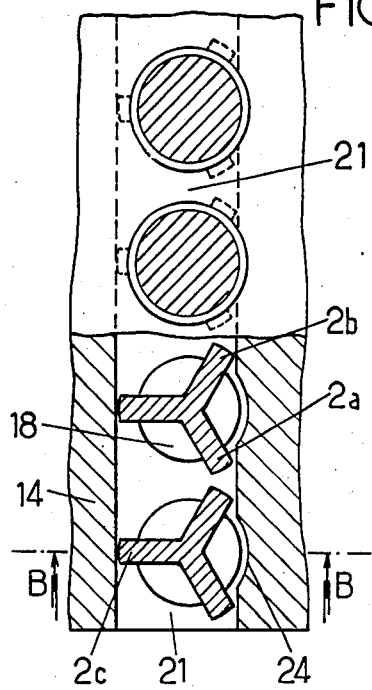
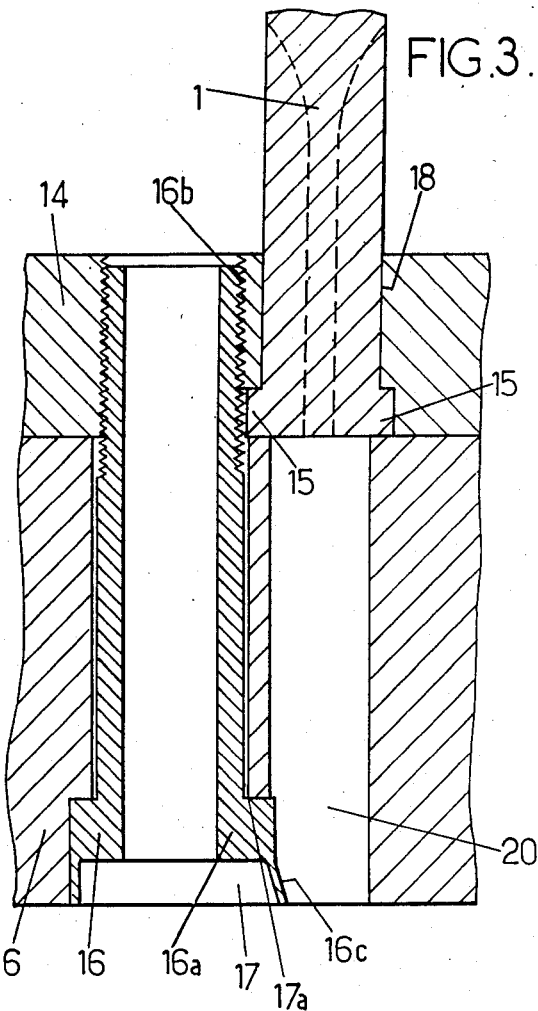
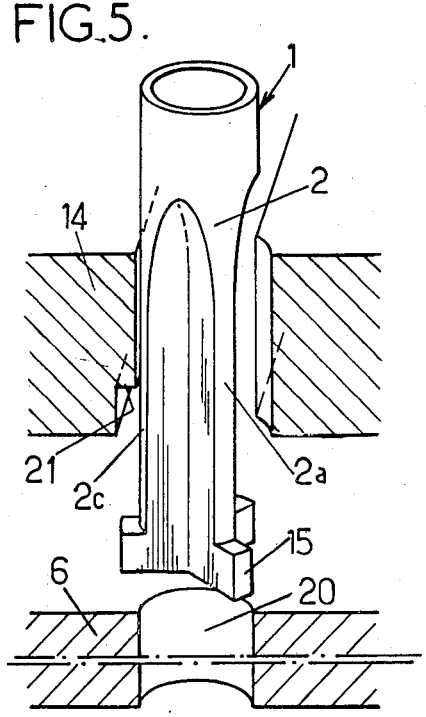
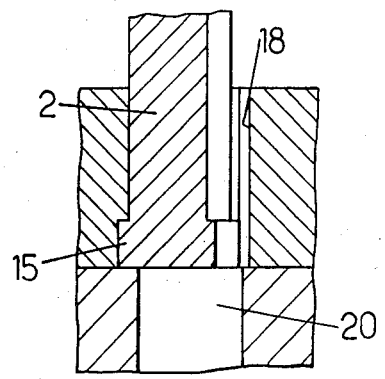

FUEL ASSEMBLY FOR A NUCLEAR REACTOR

FIELD OF THE INVENTION

The invention relates to a fuel assembly for a nuclear reactor, in which the fuel rods are fixed on the lower end plate of the assembly.

BACKGROUND OF THE INVENTION

Fuel assemblies for nuclear reactors and in particular the fuel assemblies for water nuclear reactors consist of a bundle of parallel fuel rods held by a structure consisting of spacer grids, two end plates, and guide tubes which connect the spacer grids and the end plates.

The fuel rods, which are cylindrical and of great length, are engaged in the spacer grids which hold them in position in the bundle.

The spacer grids generally provide both the transverse positioning and the axial positioning of the rods which are shorter than the guide tubes which are substituted for certain rods of the assembly. The ends of the rods are therefore free and are located at a certain distance from the end plates.

In order to provide both the axial positioning and the transversal positioning of the rods by virtue of the spacer grids, it is necessary to use springs which exert a high transversal force on the rods.

PRIOR ART

To improve the neutron yield of the reactor core, use is generally made of a zirconium alloy with a low neutron absorption for forming the grids of the assembly.

However, the springs must be made of a nickel alloy to make it possible to obtain adequate elastic and mechanical properties of the spring under irradiation.

Thought has therefore been given to separating the functions of transverse positioning and of axial positioning of the rods by fixing the latter at one of their ends on the lower end plate of the assembly. This, however, has the disadvantage of complicating the structure of the lower end plate, of making its disassembly more awkward, and of reducing the cross-section of flow of the primary fluid in the assembly.

SUMMARY OF THE INVENTION

The aim of the invention is therefore to propose à fuel assembly for a nuclear reactor, which consists of a bundle of fuel rods which are cylindrical over at least a part of their length, are parallel and are held by a structure which consists of spacer grids which are transverse relative to the rods, by two transverse end plates and by guide tubes which are connected to the spacer grids and to the end plates and which are substituted for certain rods of the bundle, the rods being fixed at one of their ends on one of the end plates arranged in the lower part of the assembly, when this assembly is in a vertical working position in the reactor core, this fuel assembly needing to have a lower end plate of a simple structure which permits easy dismantling and an adequate flow cross-section of primary fluid, while permitting efficient axial and transverse positioning of the rods.

To this end, the assembly comprises, in addition an attachment plate which is superimposed on the lower end plate and attached to the latter against its upper face, comprising openings throughout its thickness each of which corresponds, in diameter and position, to a fuel rod, and opening into parallel grooves, each corresponding to a row of rods, which are machined on the lower surface of the plate in contact with the end plate which is itself pierced with holes opposite each of the rods, and each rod comprises a lower part the transverse section of which has three branches at 120° angles to each other, each of the corresponding radial expansions terminating at the bottom in a shoulder projecting in the radial direction relative to the outline of the cylindrical part of the rod, the rods passing through the attachment plate in such a way that their lower part projecting by a height which is substantially equal to the depth of the grooves is arranged in the corresponding groove for their locking in rotation and their axial fixing between the end plate and the attachment plate.

BRIEF DESCRIPTION OF THE DRAWINGS

In order that the invention may be more clearly understood, a description will now be given of a fuel assembly according to the invention employed in the case of a nuclear reactor of improved neutron yield.

FIG. 2 shows a partial view along C—C of FIG. 1.

FIG. 3 shows a view in vertical section along a plate orthogonal to that of FIG. 2 and passing through the axes of a bush and a fuel rod.

FIG. 4 shows a view in section along B—B of FIG. 2.

FIG. 5 is an isometric exploded view, in partial cross-section, illustrating the connection between a rod plug and the lower end plate.

DETAILED DESCRIPTION

Figure 1:
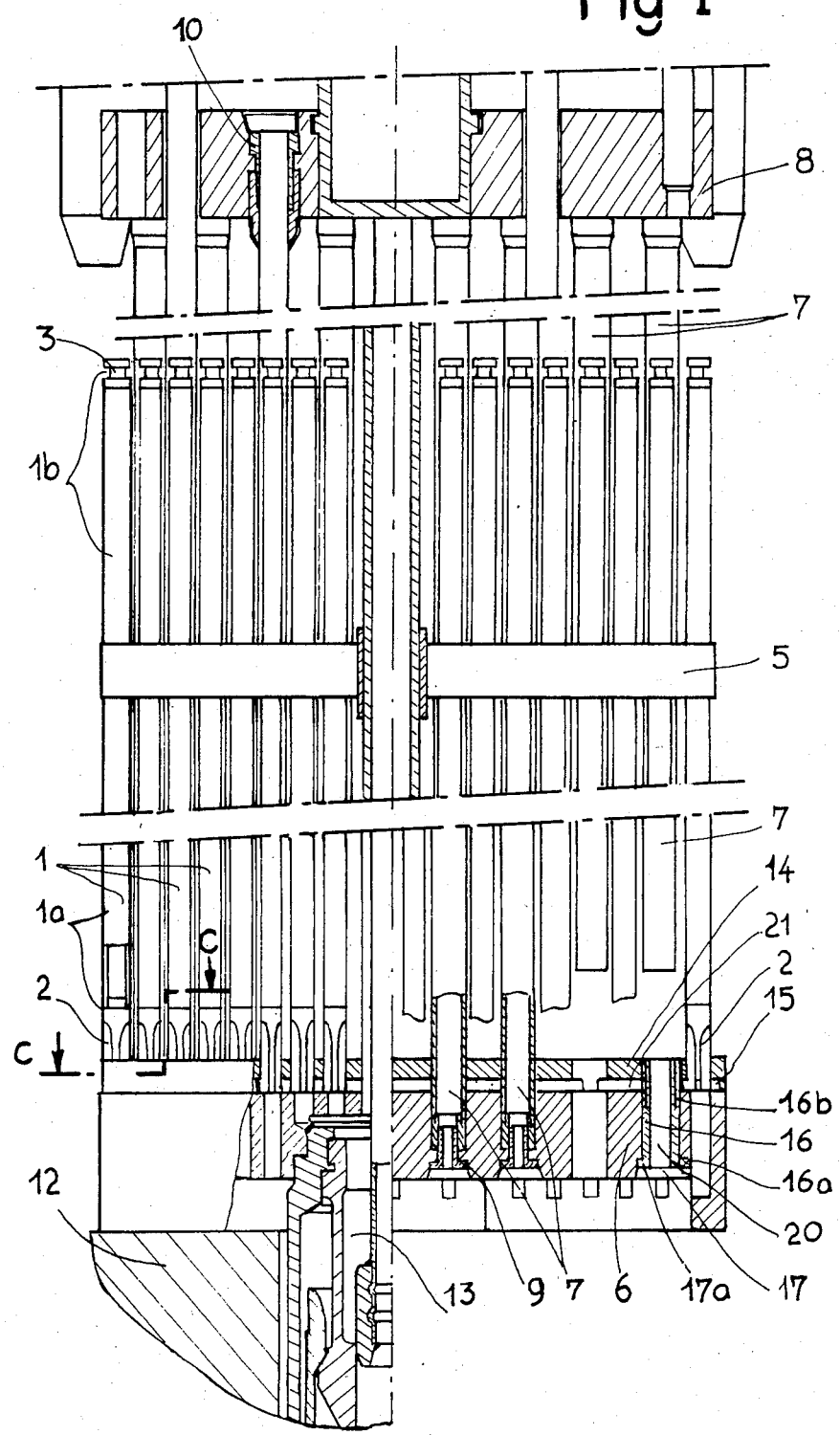
FIG. 1 shows a view in side elevation with partial section of a part of a fuel assembly according to the invention.

FIG. 1 shows a fuel assembly employed in a nuclear reactor of improved yield as described in French No. 2,535,508.

This assembly comprises a set of fuel rods 1 which consist of a sheath tube enclosing pellets of fuel material. The tube is closed at its lower end by a plug 2 and at its upper end by a plug 3. The rod zone 1a located just above the lower plug 2 is filled with fertile material which replaces the fissile fuel material filling the median zone of the rod. The same applies to the zone 1b located below the upper plug 3 of the rod.

Thus in each of the assemblies and in the entire core, an upper blanket and a lower blanket of fertile material is formed, allowing the neutron yield of the reactor to be improved, as described in French No. 2,535,508.

The rods 1 are held in a structure consisting of the spacer grids 5 for transversal positioning of rods 1, the lower end plate 6, the upper end plate 8 and the guide tubes 7 which are connected to the grids 5 and which are fixed at one of their ends on the lower end plate 6 and at their other ends on the upper end plate 8. The guide tubes 7 thus ensure the positioning and the rigidity of the support structure of the rods 1.

The guide tubes 7 are fixed in openings which penetrate the end plates 6 and 8, by means of a tapped end portion on which may be engaged the threaded portion of a bush 9 (for the lower end plate) or 10 (for the upper end plate).

After screwing the bushes 9 and 10 into the tapped ends of the guide tubes 7, locking of these bushes in rotation is carried out.

The fuel assembly is fixed by its lower part on the lower core plate 12 by a device with a central control 13 shown in outline in FIG. 1.

This device for fixing the lower part of the assembly was the subject of French No. 2,517,867 in the name of the assignee of the present application.

With reference to FIGS. 1 to 5, a description will now be given of the device for fixing the lower part of the fuel rods on the lower end plate 6.

The lower plug 2 of the fuel rods is machined over the majority of its length in a section which is seen in FIG. 2 and which has three radial branches 2a, 2b and 2c at 120°. Each of the radial expansions corresponding to the branches 2a, 2b and 2c comprises in addition in its lower portion a shoulder 15 projecting relative to the circular section of the rod in its cylindrical part in which is inscribed the section of the plug, with the exception of the parts projecting in the radial direction 15.

An attachment plate 14 rests with its lower face on the upper face of the end plate 6 on which this plate 14 is fixed by threaded hollow bushes 16 engaged in openings 17 which penetrate the lower end plate 6. Each of the openings 17 comprises a shoulder 17a on which bears the head 16a of the bush 16.

The threaded part 16b of the bush 16 is screwed into a tapped hole provided in the plate 14 in the extension of the opening 17 of the end plate 6. After the bush 16 is screwed in, its locking in rotation is carried out by deformation of an upper skirt 16c extending the head 16a of the bush, into grooves provided at the entry of the opening 17.

It is possible in this way to fix the plate 14 in a perfectly stable manner on the end plate 6.

The plate 14 comprises openings 18 with a diameter which is substantially equal to the diameter of the cylindrical part of the fuel rods 1, and in locations which correspond to the locations of the rods of the bundle.

In the extension of each of the rods and of the openings 18, the end plate 6 is also pierced by holes 20 of a diameter near to that of the rods.

The end plate 6 comprises therefore three types of perforations which penetrate right through it: the fixing openings of the guide tubes, the passage openings for the hollow attachment bushes 16 of the plate 14 and the holes 20 allowing the passage of the cooling water of the reactor around the lower part of the rods 1. The hollow bushes 16 also allow the passage of the cooling water.

Similarly the attachment plate 14 comprises three types of perforations penetrating right through it: the holes for passing the guide tubes 7, the openings 18 for fixing the fuel rods 1 and the tapped holes for the screwing in of bushes 16.

The lower surface of the attachment plate 14 has furthermore a set of grooves 21 which are parallel to each other and each of which corresponds to a row of fuel rods. The openings 18 for the passage of the lower part of the rods lead out at their lower end into the interior of the grooves 21.

As may be seen in FIG. 1, the depth of the grooves 21 corresponds to the height of the radial shoulder 15 provided on the plugs 2 of the fuel rods 1. In the case of an assembly for a nuclear reactor with improved yield as described, this depth is 5 mm. The dimension of the shoulders 15 in the radial direction is 2 mm.

The width of the grooves 21 machined on the lower surface of the plate 14 is chosen so that one of the radial branches of the lower part of the rod is perpendicular to the axis of the groove, as shown in FIG. 2. The three branches being at 120°, the axis of the rod is offset to a slight extent relative to the median plane of the groove, so that it is necessary to provide cylindrical recesses 24 in a wall of the groove, to make it possible to place the rods on the plate 14.

In the case of an assembly with rods of a diameter of 9.5 mm, the width of the groove is 8 mm.

We shall now describe the operations required for the fitting and the fixing of the rods in the assembly.

This fitting is carried out on an assembly the structure of which comprises the upper end plate, the guide tubes and the spacer plates, with the lower end plate not yet being placed in position.

To begin with, the attachment plate 14 is placed in position on the lower end of the guide tubes, the plate 14 comprising a system of holes corresponding to the position of these guide tubes. The rods are then inserted through the positioning plate 14 and through the spacer grids 5, these rods being stopped by the shoulders 15 of the lower plugs 2 which abut on the bottom of the grooves 21 machined in the attachment plate 14. The rods can be placed in position in only one way in the grooves which ensure their locking in rotation.

The lower plate 6 is then placed in position on the ends of the guide tubes, the plate 14 then resting on the upper surface of the end plate 6. The lower end plate is then attached to the guide tubes by virtue of the threaded bushes 9 which are locked in rotation when they have been screwed into the ends of the guide tubes.

The plate 14 is then fixed on the end plate 6 by virtue of the threaded bushes 16 which are also locked in rotation when they have been screwed in, by virtue of the skirt 16c which is deformed inside the grooves provided in the end plate 6.

The rods 1 are then perfectly immobilized in the assembly in axial translation as well as in rotation. These rods are held laterally by the grids 5 which comprise only small bosses for holding the rods, and no longer the Inconel springs, as did the spacer grids of the assemblies of the prior art.

Applicant's tests have shown that the rods fixed in this way are not subjected to abnormal modes of vibration in the reactor during operation.

Furthermore, these rods are perfectly held in the axial direction by the attachment plate 14. Nevertheless, the cross-section of flow of the cooling water in the assembly remains considerable by virtue of the shape of the lower plugs which permits the flow of the water through the end plate and the attachment plate, in a cross-section which is comparable to the cross-section of the rod and by virtue of the hollow bushes 16.

Finally, the dismantling of the lower end plate and of the rods is extremely easy because it is sufficient to unscrew the assembly bushes 16 from the plate 14 and the assembly bushes 9 from the guide tubes 7. During the unscrewing, the bush skirt is deformed to undo the locking in rotation of these bushes.

It is possible to devise other means of fixing the plate 14 on the end plate 6, so long as these means of fixing permit easy dismantling as do the bushes which have just been described.

It is equally possible to devise a shape of the profiled part of the lower plug of the rods which is slightly different from that which has been described, provided that this shape allows an orientation and a locking in rotation of the rods in the grooves.

Finally, the assembly according to the invention applies not only in the case of the nuclear reactors with improved yield where the core comprises a layer of fertile material in its upper part and in its lower part, but also in the case of all the nuclear reactors in which the neutron balance is improved by reducing the quantity of material absorbing the neutrons in the fuel assemblies.

We claim:

1. A nuclear fuel assembly for use in upright position, comprising:
    (a) a bundle of vertical fuel rods distributed in a regular array and each having a closure plug at the lower end thereof;
    (b) a structure having
        (i) an upper end plate;
        (ii) a lower end plate;
        (iii) a plurality of guide tubes substituted for certain of said fuel rods in the bundle;
        (iv) a plurality of grids located transverse to said fuel rods and guide tubes, distributed along said bundle and secured to said guide tubes; and
    (c) an attachment plate secured against an upper surface of said lower end plate, formed with individual flow openings in alignment with said fuel rods, having a circular cross-section corresponding to that of said fuel rods and formed with a plurality of parallel downwardly facing grooves each corresponding to a row of said rods in said bundle and each communicating with a plurality of said openings;
    (d) wherein each of said closure plugs is formed with axially extending recesses defining at least three branches distributed angularly at equal intervals, and each of said branches has a lower radially outwardly projecting extension having a height corresponding to the depth of said grooves and projecting from the cross section of said plug by an amount proportioned to the width of said grooves for preventing rotation of said plugs in said grooves.

2. The fuel assembly as claimed in claim 1, wherein the attachment plate (14) is fixed on the end plate (6) through the intermediary of threaded hollow bushes (16) which are positioned inside openings (17) penetrating the end plate (6), are screwed into tapped holes in the plate (14) and which comprise a deformable skirt (16c) for its locking in rotation by deformation of the skirt in grooves provided in the end plate (6).

3. The fuel assembly as claimed in either of claims 1 or 2, wherein the fuel rods (1) comprise, above the lower plug (2) and below the upper plug (3), respectively, fertile material in two zones (1a) and (1b) of a small thickness relative to the length of the rod.

4. The fuel assembly as claimed in any one of claims 1 or 2, wherein the spacer grids (5) comprise only lateral protuberances or small bosses for the transversal holding of the rods (1).

5. A nuclear fuel assembly as claimed in claim 1, wherein each of said plugs has three branches and each of said grooves is laterally offset with respect to the associated row of said fuel rods.

6. A nuclear fuel assembly as claimed in claim 1, wherein the depth of each of said recesses, increases downwardly and each of said recesses extends above said attachment plate.

* * * * *